(12) United States Patent
Lommatzsch

(10) Patent No.: US 11,199,441 B2
(45) Date of Patent: Dec. 14, 2021

(54) OPTICAL DETECTOR DEVICE

(71) Applicant: FAGUS-GRECON GRETEN GMBH & CO. KG, Alfeld (DE)

(72) Inventor: Thomas Lommatzsch, Gronau (DE)

(73) Assignee: Fagus-Grecon Greten Gmbh & Co. Kg, Alfeld (DE)

( * ) Notice: Subject to any disclaimer, the term of this patent is extended or adjusted under 35 U.S.C. 154(b) by 19 days.

(21) Appl. No.: 16/636,088

(22) PCT Filed: Jul. 10, 2018

(86) PCT No.: PCT/DE2018/000209
§ 371 (c)(1),
(2) Date: Feb. 3, 2020

(87) PCT Pub. No.: WO2019/024953
PCT Pub. Date: Feb. 7, 2019

(65) Prior Publication Data
US 2020/0249082 A1    Aug. 6, 2020

(30) Foreign Application Priority Data

Aug. 1, 2017    (DE) .............................. 102017007176

(51) Int. Cl.
*G01J 1/04* (2006.01)
*G01J 1/42* (2006.01)
*G02B 6/42* (2006.01)

(52) U.S. Cl.
CPC ............. *G01J 1/0425* (2013.01); *G01J 1/429* (2013.01); *G01J 1/4228* (2013.01); *G02B 6/4298* (2013.01)

(58) Field of Classification Search
CPC .... G01B 6/1228; G01B 6/12004; G01B 6/42; G01B 6/4298; G01B 6/29317; G01B 6/3624; H01L 31/02327; G01J 1/0425; G01J 1/429; G01J 1/4228; G01J 5/0818; G01J 3/0218; G01N 21/7746; G01N 2201/088; G01N 2201/08; A61B 5/6885; A61B 2090/306
USPC ........ 356/432–440, 73.1, 335–343; 385/116, 385/147, 12, 43, 15; 250/227.11
See application file for complete search history.

(56) References Cited

U.S. PATENT DOCUMENTS

| | | | | |
|---|---|---|---|---|
| 5,347,122 A * | 9/1994 | Ansorge | ................. | G01N 21/76 250/227.11 |
| 5,953,477 A * | 9/1999 | Wach | ................. | G01N 21/7703 385/115 |
| 6,135,760 A | 10/2000 | Cusack et al. | | |
| 6,191,852 B1 * | 2/2001 | Paffhausen | ........ | G01N 21/6452 356/244 |

(Continued)

FOREIGN PATENT DOCUMENTS

| DE | 102009002751 A1 | 11/2010 |
|---|---|---|
| DE | 202013006142 U1 * | 10/2013 |
| DE | 102014212508 A1 | 12/2015 |

*Primary Examiner* — Hoa Q Pham
(74) *Attorney, Agent, or Firm* — Laurence A. Greenberg; Werner H. Stemer; Ralph E. Locher

(57) ABSTRACT

An optical detector device includes a housing with a projecting neck that is closed off towards the outside by a light-transmissive pane, under which at least one optical waveguide that tapers in the direction of an optical sensor is disposed. An optical waveguide arrangement has a plurality of optical waveguides which are retained in the neck by a holding mechanism.

13 Claims, 4 Drawing Sheets

(56) References Cited

U.S. PATENT DOCUMENTS

| | | | |
|---|---|---|---|
| 6,438,296 B1 * | 8/2002 | Kongable | G02B 6/04 |
| | | | 356/4.01 |
| 8,665,440 B1 * | 3/2014 | Kompaniets | G01J 3/0205 |
| | | | 356/419 |
| 2004/0036875 A1 * | 2/2004 | Kramer | G01N 15/1459 |
| | | | 356/342 |

\* cited by examiner

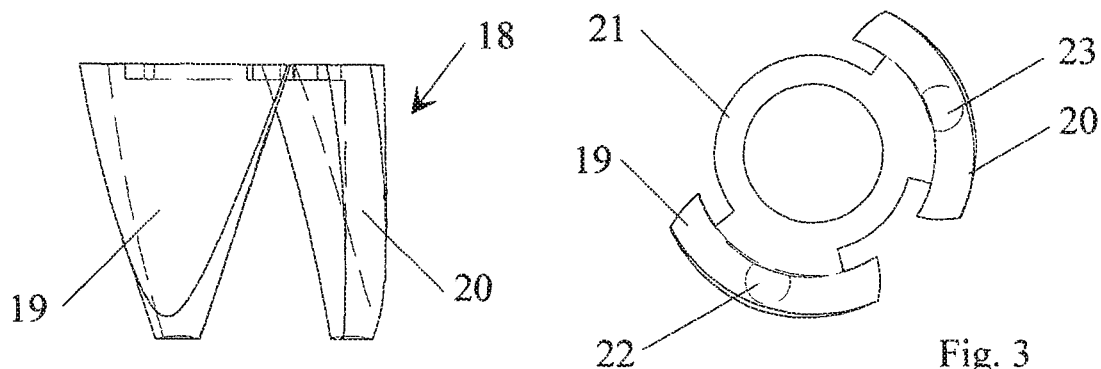
Fig. 2
Fig. 3
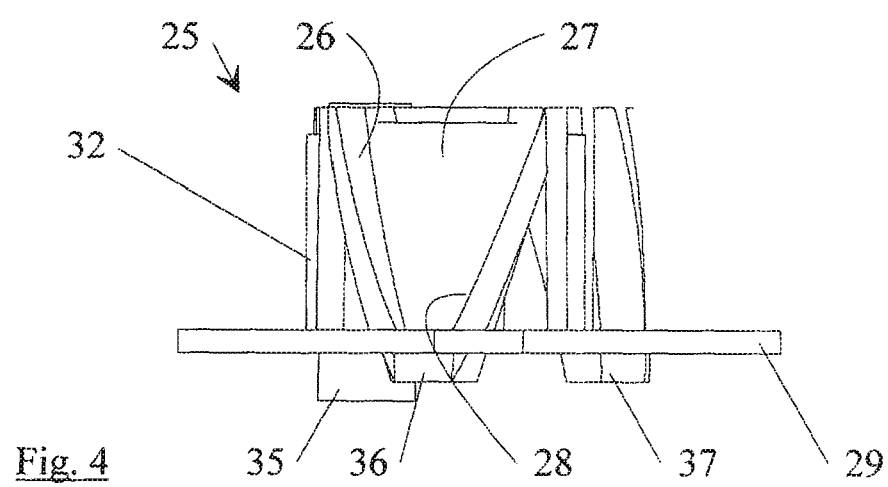
Fig. 4
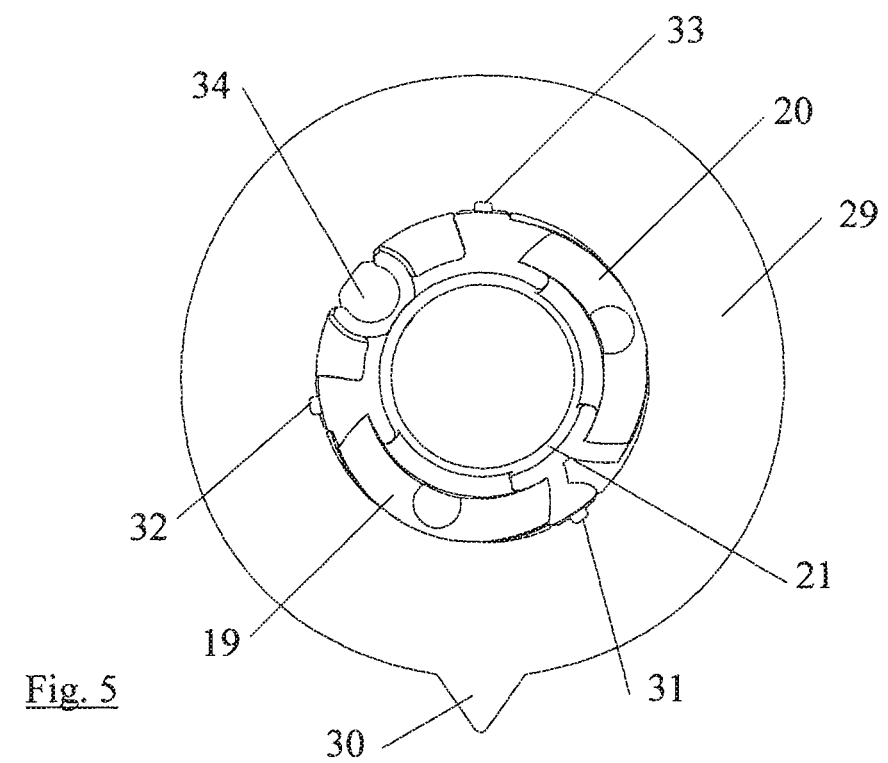
Fig. 5

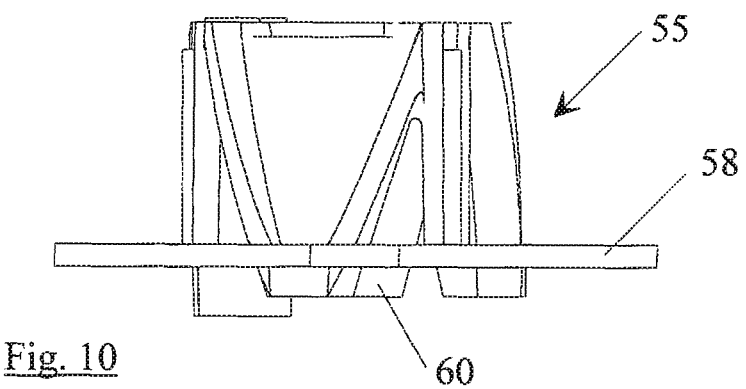
Fig. 10
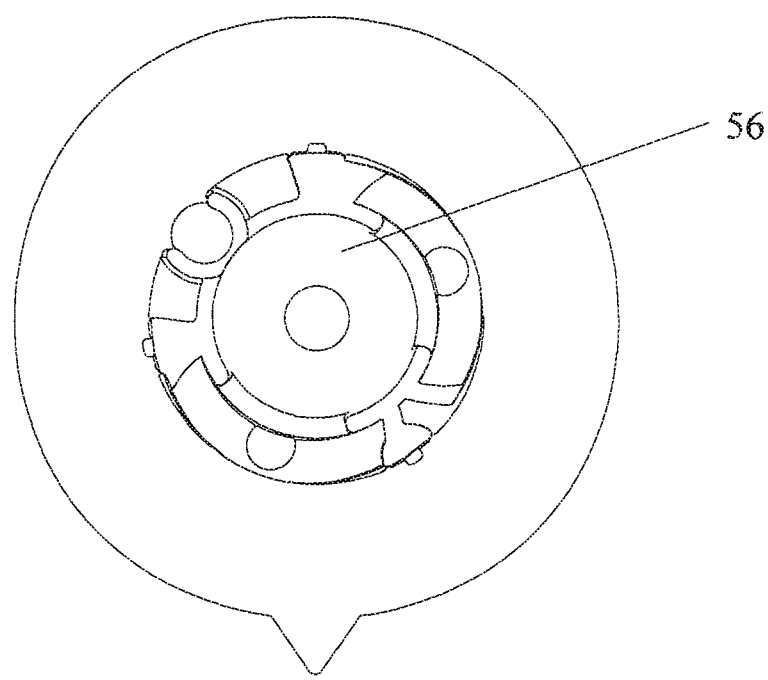
Fig. 11
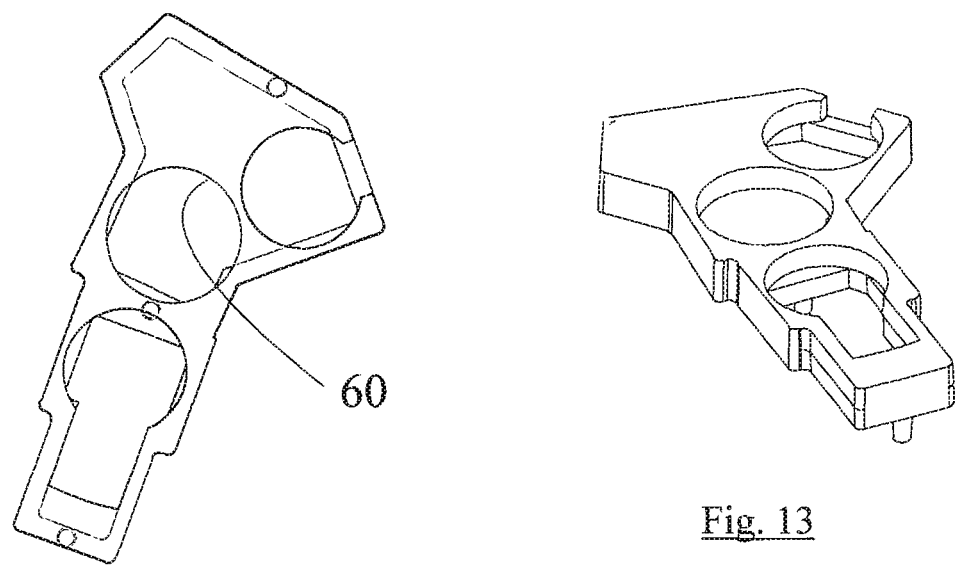
Fig. 12
Fig. 13

OPTICAL DETECTOR DEVICE

BACKGROUND OF THE INVENTION

Field of the Invention

The invention relates to an optical detector device, which comprises a housing having a protruding neck, which is closed off to the outside by a light-transmissive pane, under which at least one optical waveguide which tapers toward an optical sensor is arranged.

Such a device for detecting pockets of sparks, fire and embers within a material stream is known from DE 20 2013 006 142 U1. In the exemplary embodiment illustrated there, a cylindrical sheath of a suitably coated optical waveguide is received in the neck of the housing and this optical waveguide tapers toward an optical sensor to a cross section which corresponds to the active surface of the sensor, a photosensitive element.

In the case of this device, it has proven to be problematic to monitor the entire spectrum, understood here as the entire range from infrared to ultraviolet, with only one sensor.

SUMMARY OF THE INVENTION

Against this background, the object of the invention is to provide an optical detector device with which a high-precision measurement of the entire spectrum is enabled.

This technical problem is solved in the case of a detector device of the type in question by a housing having a protruding neck, which is closed off to the outside by a light-transmissive pane, under which at least one optical waveguide which tapers toward an optical sensor is disposed, and an optical waveguide arrangement having a plurality of optical waveguides which are held in the neck by a holding device. On the basis of these features, the detector device according to the invention offers a multiplicity of advantages.

An optical waveguide arrangement having two or three optical waveguides is preferably provided, so that sensors with different characteristics can be used. Therefore, overheating and in particular sparks or the like within the material stream can be detected with considerable improvement.

For the holding and the positioning of the optical waveguide arrangement having the optical waveguides inside the neck, which passes through the wall of a pipe that bounds the material stream, a holding device is provided.

Preferably, both the optical waveguide arrangement and the holding device are each themselves integrally formed.

The holding device is inserted, for example by means of tongues and grooves provided, non-rotatably in the neck and is therefore aligned exactly. Lying on the holding device, under the pane, is a ring of the optical waveguide arrangement to which the optical waveguides are connected, in particular radially on the outside.

Because the holding device is received non-rotatably in the neck and further the optical waveguide arrangement is also held non-rotatably and uniquely in the holding device, each optical waveguide is positioned exactly over one sensor.

In the case of the optical detector device according to the invention it can further be provided that the ring is closed by a central optical waveguide, preferably conically tapered toward an optical sensor.

Therefore, there is the possibility of applying a signal to different optical sensors inside a housing simultaneously, wherein the exact positioning of the optical waveguides over the sensors is specified.

In a structural embodiment it is further provided that the holding device encloses the optical waveguides with and exact fit and at least the contact surfaces of the holding device at the optical waveguides are reflectively formed. Therefore, reflections among the optical waveguides inside the neck are largely precluded.

The optical waveguides protrude slightly underneath the holding device, but this is not really inconvenient because it is provided in a development that the holding device comprises a shoulder which limits the insertion depth into the neck, that the shoulder is mounted on a receiver on a printed circuit board and that the receiver comprises cut-outs, in which sensors or emitters are arranged. If one sensor is arranged in each cut-out, then the protrusions of the optical waveguides engage in these cut-outs and there is no mutual disturbance there either.

This is definitely ruled out if tubulars sheaths, enclosing the optical waveguides, protrude underneath the shoulder. Therefore, only a light-exit opening perpendicular to the axial extent of the neck remains.

In a further embodiment, pins which engage in cut-outs of the printed circuit board comprising an electronic evaluation system can protrude underneath the receiver. Therefore, the receiver and the holder having the optical waveguide arrangement are aligned to each other in an exactly radial and exactly axial fashion and predeterminably.

In a second variant of the detector device it is provided that the receiver comprises a cylinder, which passes through the center of the holding device, wherein in particular the open ring and the shaft have the same inner diameter, and that a sensor is held directly under the pane by the cylinder.

This is appropriate in particular for sensors with a large active surface.

The optical properties of the material stream are passively measured by means of the sensors. Emitters, which can likewise be arranged in or beside cut-outs of the receiver, serve for active measurements. For emitting for example a UV light, it is then further provided that the holding device forms a channel, axially parallel to the neck, over an emitter. For technical production reasons, this channel is preferably arranged radially outside the holding device and is provided with a slit toward the inner wall of the neck.

By means of the detector device according to the invention, the spectrum from infrared to ultraviolet can be monitored in this way by means of the use of a plurality of sensors and/or emitters.

The nature of the invention is explained in greater detail by the drawing, in which exemplary embodiments only are illustrated.

BRIEF DESCRIPTION OF THE SEVERAL VIEWS OF THE DRAWING

FIG. 2 shows a side view of an optical waveguide arrangement having two optical waveguides connected to a ring, FIG. 3 shows a top view, FIG. 4 shows a side view of an associated holding device, FIG. 5 shows a top view, FIG. 10 shows a lateral illustration of an associated holding device, FIG. 11 shows a top view, FIG. 12 shows a top view of an associated receiver and FIG. 13 shows an isometric illustration.

DETAILED DESCRIPTION OF THE INVENTION

Figure 1:
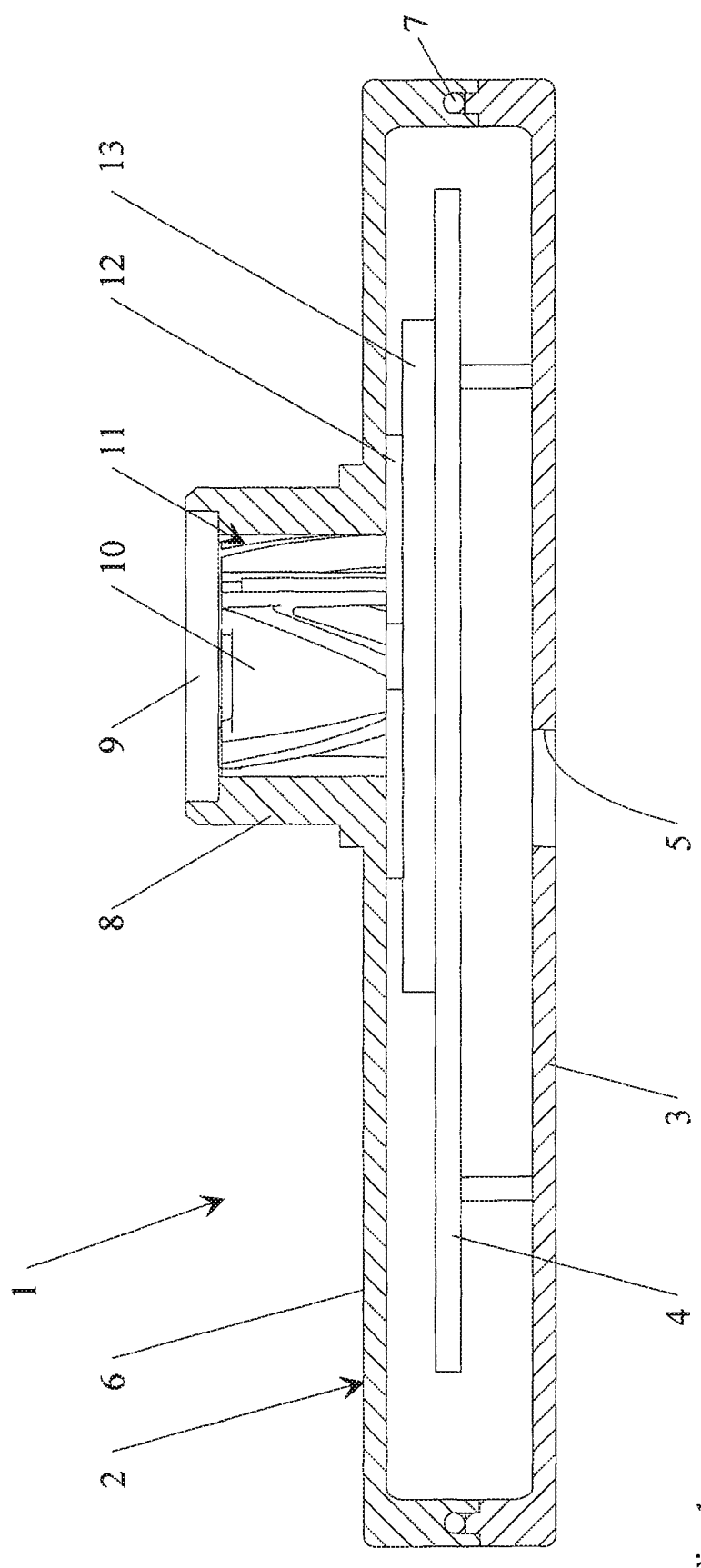
FIG. 1 shows a schematic section, not to scale, through a detector device according to the invention.

FIG. 1 shows an idealized section, not to scale, through an optical detector device 1 according to the invention. Its housing 2 is constructed as two shells. A printed circuit board 4 for the electronics is fixed in the lower shell 3. It is connected through an opening 5 using an inserted plug contact or a led-through cable harness.

The upper shell 6 is screwed to the lower shell 3 by a sealing ring 7 and comprises a protruding neck 8, which passes through the wall of a pipe for a material stream. Outwardly, toward the material stream, the neck 8 is closed in a standard way by a light-transmissive pane 9.

An optical waveguide arrangement 10 is held in the shaft 8 by a holding device 11, inserted non-rotatably in the shaft 8, likewise non-rotatably and in a unique way and is positioned exactly over the printed circuit board 4 having sensors, as will be further explained hereinafter.

The insertion depth of the holding device 11 into the neck 8 is limited by means of a shoulder 12, which itself is mounted on a receiver 13 on the printed circuit board 4.

A first embodiment of an optical waveguide arrangement 18 is explained by FIGS. 2 and 3.

The optical waveguide arrangement 18 comprises two optical waveguides 19,20, which are manufactured in an integral way with a ring 21 and are connected with this ring radially outside. The optical waveguides 19,20 taper toward sensors on the printed circuit board 4 to cross-sections 22,23, which substantially correspond to the active surface of sensors.

The optical waveguide arrangement 18 is uniquely held inside the neck 8 in a holding device 25 according to FIGS. 4 and 5 on the basis of the arrangement of the optical waveguides 19,20 at the ring 21. In this case, the ring 21 closes off the top side exactly in a plane having the holding device 25 and the ring is positioned by said holding device directly under the pane 9.

Furthermore, each optical waveguide 19,20 is enclosed by contact surfaces 26-28 of cut-outs 38 of the holding device 25 in the circumferential direction and is enclosed radially inside with an exact fit and is held against the inner wall of the neck 8 along its axial length.

The insertion depth of the holding device 25 having the optical waveguide arrangement 18 in the neck 8 is limited by means of a shoulder 29. The shoulder 29 is provided with an arrow tip 30, which has its counterpart in the upper shell 6, so that an easy insertion of the holding device 25 having the optical waveguide arrangement 18 into the shaft 8 is ensured, said insertion being non-rotatable on the basis of the tongues 31-33 engaging in grooves of the neck 8, and therefore also an exact positioning of the lower ends of the optical waveguides over corresponding sensors.

The top view according to FIG. 5 further shows that the holding device 25 forms a channel 34, which is axially parallel to the neck 8 and opened to the inner wall thereof. Through the channel, an emitter located underneath can emit its energy.

The side view according to FIG. 4 shows tubular like sheaths underneath the shoulder 29, of which sheaths the sheath 35 can be mounted directly on an emitter, so that a lateral emission is largely prevented. In contrast, the sheaths 36,37 close off the optical waveguides 19,20 radially outward.

Figure 6:
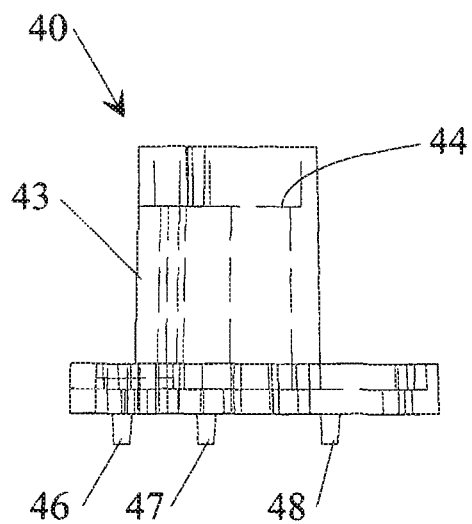
FIG. 6 shows a side view of an associated receiver.
Figure 7:
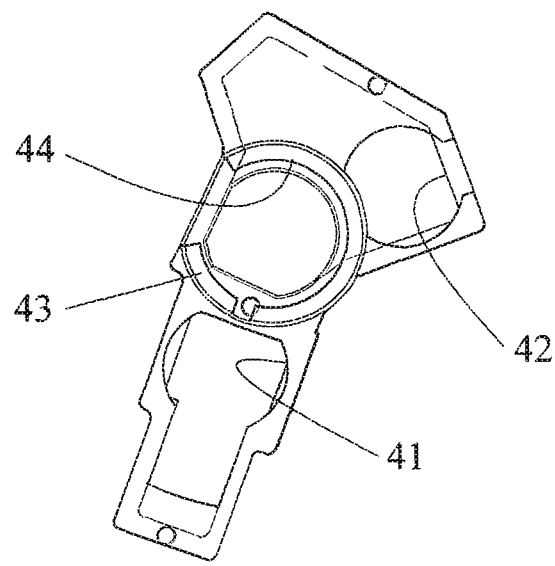
FIG. 7 shows a top view.

The holding device 25 having the optical waveguide arrangement 18 is mounted directly on a receiver 40 according to FIGS. 6 and 7 and the sheaths 36,37 enclosing the optical waveguides 19,20 engage in cut-outs 41,42 and end there directly over sensors not illustrated any further. The sheath 35 ends freely over an emitter, wherein by means of the arrangement of the light-sensitive sensors in the cut-outs 41,42, these are not influenced by emitted energy of the emitter.

The side view according to FIG. 6 shows a rising cylinder 43 of the receiver 40 having a ring shoulder 44. A non-illustrated sensor, which is mounted on the ring shoulder 44 and is aligned by means of a lug of the sensors engaging in a slit 45 can be inserted in the shaft 43. Then the sensor closes off the top side underneath the ring 21, whose clear width preferably corresponds to the diameter of the active surface of the sensor.

The receiver 40 comprises three pins 46-48 underneath, which engage in corresponding cut-outs of the printed circuit board 4. An exact positioning of the receiver 40, the holding device 25 and the optical waveguide arrangement 18 to each other and to the sensors or emitters arranged on the printed circuit board 4 is therefore ensured.

A further exemplary embodiment of a detector device according to the invention is explained by FIGS. 8 to 13.

Figure 8:
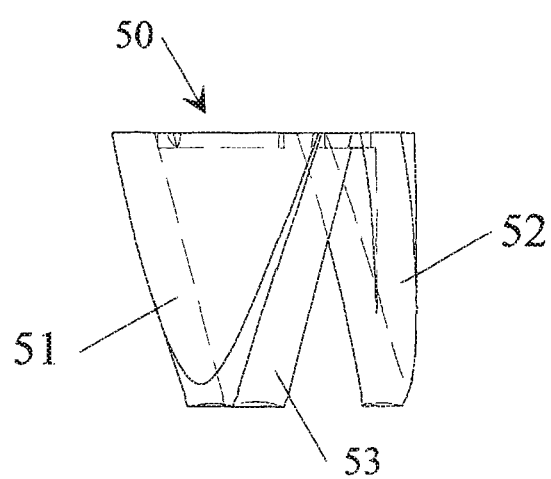
FIG. 8 shows a further optical waveguide arrangement in a side view.
Figure 9:
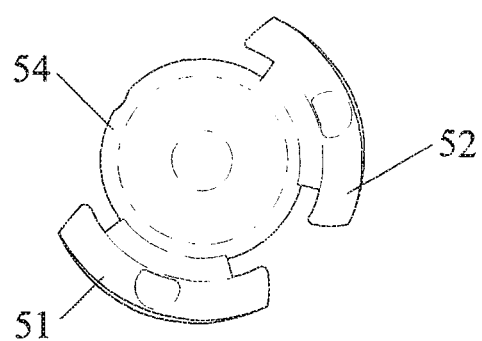
FIG. 9 shows a top view.

In addition to the optical waveguides 51,52 located radially outside according to the preceding exemplary embodiment, the optical waveguide arrangement 50 according to FIGS. 8 and 9 comprises a central third optical waveguide 53, which is likewise substantially conically tapered toward a sensor.

The central optical waveguide 53 closes the ring 54 indicated in FIG. 9 and is formed integrally with this ring and both of the further optical waveguides 51,52.

According to FIGS. 10 and 11, the holding device 55 correspondingly forms centrally a funnel-like contact surface 56 for the central optical waveguide 53.

Therefore the cylinder of the previous exemplary embodiment is omitted from the receiver 57 according to FIGS. 12 and 13 and the tubular sheath 59 that protrudes underneath the shoulder 58 of the holding device 55 and encloses the optical waveguide 53 engages in the cut-out 60 of the receiver 57.

In the drawing, it is not illustrated that the contact surfaces of the receivers for enclosing the optical waveguides are reflectively formed.

The invention claimed is:

1. An optical detector device, comprising:
   a housing having a protruding neck;
   a light-transmissive pane outwardly closing off said neck;
   a one-piece optical waveguide arrangement having a plurality of optical waveguides disposed under said pane, said optical waveguides configured to taper toward an optical sensor and said optical waveguides each configured to be positioned above a respective optical sensor; and
   a holding device holding said plurality of optical waveguides in said neck.

2. The detector device according to claim 1, wherein said optical waveguide arrangement includes a central ring disposed under said pane, said ring lying on said holding device, and said plurality of optical waveguides being radially outwardly connected to said ring.

3. The detector device according to claim 2, wherein said plurality of optical waveguides includes a central optical waveguide closing said ring.

4. The detector device according to claim 1, wherein said holding device is formed integrally or in one piece.

5. The detector device according to claim 1, wherein said holding device is non-rotatably and uniquely inserted in said neck, and said optical waveguide arrangement is non-rotatably and uniquely held in said holding device.

6. The detector device according to claim 1, wherein said holding device (25) encloses said optical waveguides (19, 20; 51, 52, 53) with an exact fit.

7. The detector device according to claim 1, wherein said holding device has contact surfaces at said optical waveguides, and at least said contact surfaces are reflective.

8. The detector device according to claim 1, which further comprises:
a printed circuit board;
a receiver disposed on said printed circuit board, said receiver having cutouts for receiving sensors or emitters; and
said holding device including a shoulder mounted on said receiver, said shoulder limiting an insertion depth in said neck.

9. The detector device according to claim 8, which further comprises tubular sheaths protruding under said shoulder and enclosing said optical waveguides.

10. The detector device according to claim 8, which further comprises pins protruding under said receiver and engaging in cut-outs in said printed circuit board, said printed circuit board configured to support an electronic evaluation system.

11. The detector device according to claim 8, wherein said receiver includes a cylinder centrally passing through said holding device, said cylinder configured to hold a sensor under said pane.

12. The detector device according to claim 1, wherein said holding device forms a channel being axially parallel to said neck and configured to be disposed over an emitter.

13. The detector device according to claim 1, which further comprises a printed circuit board configured to support a plurality of at least one of sensors or emitters for monitoring a spectrum from infrared to ultraviolet.

* * * * *